(12) United States Patent
Song et al.

(10) Patent No.: US 11,305,859 B2
(45) Date of Patent: Apr. 19, 2022

(54) METHOD FOR FORMING A COMPOSITE STRUCTURE

(71) Applicant: The Boeing Company, Chicago, IL (US)

(72) Inventors: Weidong Song, Woodinville, WA (US); Gerard J. Gallo, Charleston, SC (US); Gwen Marie Lanphere Gross, Redmond, WA (US); Jamie J. Langabeer, Everett, WA (US); Jason J. McBain, Melbourne (AU); Stephen L. Metschan, Black Diamond, WA (US); Jeffrey H. Olberg, Federal Way, WA (US); Max M. Osborne, Melbourne (AU); Richard V. Phillips, Enumclaw, WA (US); Paul D. Evans, Melbourne (AU); Hugh A. Yap, Phoenix, AZ (US); Nicholas J. Zayas, Seattle, WA (US)

(73) Assignee: The Boeing Company, Chicago, IL (US)

( * ) Notice: Subject to any disclaimer, the term of this patent is extended or adjusted under 35 U.S.C. 154(b) by 554 days.

(21) Appl. No.: 15/938,175

(22) Filed: Mar. 28, 2018

(65) Prior Publication Data

US 2019/0300141 A1 Oct. 3, 2019

(51) Int. Cl.
*B29C 70/48* (2006.01)
*B64C 1/12* (2006.01)
(Continued)

(52) U.S. Cl.
CPC .............. *B64C 1/12* (2013.01); *B29C 70/48* (2013.01); *B29C 70/542* (2013.01); *B29C 70/86* (2013.01);
(Continued)

(58) Field of Classification Search
CPC ......... B64C 1/12; B64C 1/064; B29C 70/865; B29C 70/48; B29C 70/542; B29C 70/86;
(Continued)

(56) References Cited

U.S. PATENT DOCUMENTS

| 5,272,000 A | 12/1993 | Chenoweth et al. |
| 6,231,941 B1 * | 5/2001 | Cundiff ................. B29C 70/083 |
| | | 428/36.3 |

(Continued)

FOREIGN PATENT DOCUMENTS

| CN | 1344205 | 4/2002 |
| CN | 107225773 | 10/2017 |

(Continued)

OTHER PUBLICATIONS

European Patent Office, "Extended European Search Report," App. No. 19154663.9 (dated Sep. 18, 2019).

(Continued)

*Primary Examiner* — Leith S Shafi
(74) *Attorney, Agent, or Firm* — Walters & Wasylyna LLC

(57) ABSTRACT

A method for forming a composite structure includes the steps of: forming a fiber-reinforced polymer paste to a shape of a cavity of a dry fiber preform structure; heating said dry fiber preform structure having said fiber-reinforced polymer in said cavity to an infusion temperature; infusing resin into said dry fiber preform structure and around said fiber-reinforced polymer; and curing said resin-infused fiber preform structure and said fiber-reinforced polymer at a cure temperature higher than said infusion temperature.

20 Claims, 6 Drawing Sheets

(51) Int. Cl.
  *B29C 70/54* (2006.01)
  *B29C 70/86* (2006.01)
  *B64C 1/06* (2006.01)
  *B29D 99/00* (2010.01)
  *B29L 31/30* (2006.01)
  *B64C 1/00* (2006.01)

(52) U.S. Cl.
  CPC ........ *B29C 70/865* (2013.01); *B29D 99/0003* (2013.01); *B64C 1/064* (2013.01); *B29L 2031/3076* (2013.01); *B64C 2001/0072* (2013.01)

(58) Field of Classification Search
  CPC ............ B29C 2001/0072; B29C 70/68; B29D 99/0003; B29L 2031/3076; Y02T 50/40
  See application file for complete search history.

(56) References Cited

U.S. PATENT DOCUMENTS

| | | | |
|---|---|---|---|
| 8,709,316 B2 | 4/2014 | Walia et al. | |
| 8,709,319 B2 | 4/2014 | Gideon et al. | |
| 10,272,621 B2* | 4/2019 | Ponsolle | B29C 70/222 |
| 2013/0134621 A1* | 5/2013 | Tsotsis | B29C 70/528 |
| | | | 264/177.2 |
| 2013/0189478 A1 | 7/2013 | Fisher et al. | |
| 2014/0216638 A1 | 8/2014 | Vetter et al. | |
| 2015/0217508 A1* | 8/2015 | Rossi | B29C 33/448 |
| | | | 428/80 |
| 2017/0028606 A1 | 2/2017 | Song et al. | |
| 2017/0029577 A1 | 2/2017 | Glynn et al. | |
| 2017/0029579 A1* | 2/2017 | Song | B32B 27/28 |
| 2017/0072647 A1 | 3/2017 | Perrillat et al. | |
| 2017/0197346 A1 | 7/2017 | Song et al. | |

FOREIGN PATENT DOCUMENTS

| | | |
|---|---|---|
| EP | 2 610 165 | 7/2013 |
| EP | 2 813 335 | 12/2014 |
| WO | WO 00/03854 | 1/2000 |

OTHER PUBLICATIONS

European Patent Office, "Communication pursuant to Article 94(3) EPC," App. No. 19 154 663.9 (dated Dec. 6, 2021).

China National Intellectual Property Administration, Office Action, with English translation, App. No. 201910217011.8 (dated Feb. 16, 2022).

* cited by examiner

METHOD FOR FORMING A COMPOSITE STRUCTURE

FIELD

This application relates to methods for forming composite structures and, in particular, to methods for forming a resin-infused stiffened structure using a dry fiber preform structure and a fiber-reinforced polymer paste.

BACKGROUND

The advent of aircraft with composite airframes, i.e., fiber-reinforced polymer or resin airframes, has prompted a need for systems and methods for fabricating composite structural elements of such airframes, e.g., the skins, spars, ribs, frames, and stringers thereof. As an example, longerons, frames, stringers, stiffeners, and other aircraft structural elements can be fabricated from flat composite ply layups. To stiffen them, they can be provided with complex cross-sectional shapes, e.g., an L-shape, U-shape, onion-shape, hat-shape, I-shape, T-shape, J-shape, and Z-shape, depending on, among other things, the type and amount of load the structural element is designed to carry. The complex cross-sectional shapes listed above can be formed from flat composite sections folded into the shapes. These folds have a radius of the fold that needs to be filled. For example, an "I" section can be formed with two back to back "C" sections and a top and bottom plate. The bend radius of the "C" sections form two sides of an upper and lower cavity with the top and bottom plates forming a third side. The cavities are typically three sided.

In one possible embodiment thereof, a composite structure can be fabricated by abutting legs of two composite fiber preforms so as to form a cavity at their junction, then filling the cavity with filler.

Traditional fillers known as noodles are currently less than desired.

Accordingly, those skilled in the art continue with research and development in the field of methods for forming composite structures.

SUMMARY

In one embodiment, a method for forming a composite structure includes the steps of (1) forming a fiber-reinforced polymer paste to a shape of a cavity of a dry fiber preform structure; (2) heating said dry fiber preform structure having said fiber-reinforced polymer in said cavity to an infusion temperature; (3) infusing resin into said dry fiber preform structure and around said fiber-reinforced polymer; and (4) curing said resin-infused fiber preform structure and said fiber-reinforced polymer at a cure temperature higher than said infusion temperature.

Other embodiments of the disclosed methods for forming a composite structure will become apparent from the following detailed description, the accompanying drawings and the appended claims.

DETAILED DESCRIPTION

Figure 1:
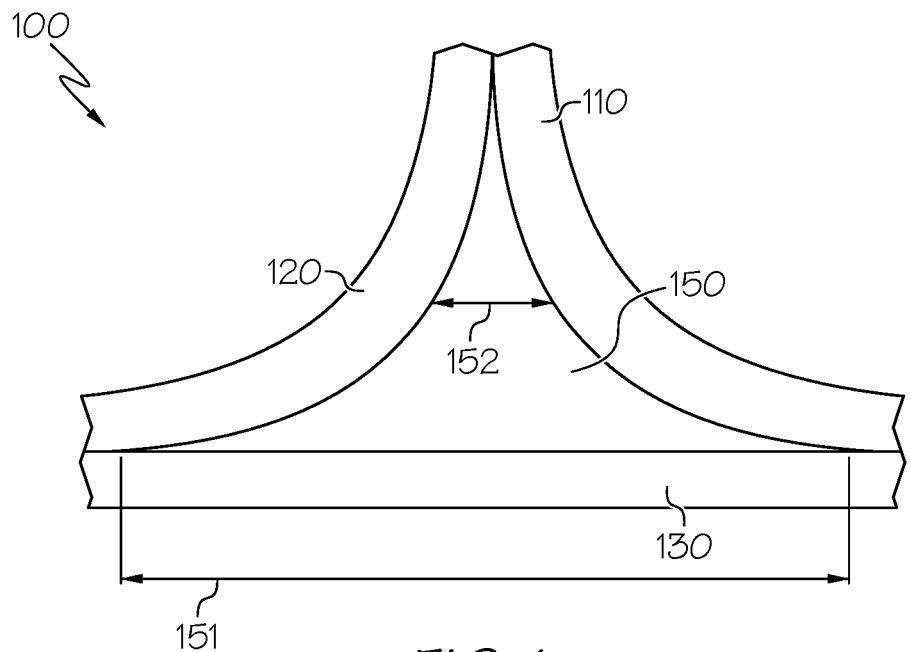
FIG. 1 illustrates a schematic cross-sectional view of a composite structure, according to an embodiment of the present disclosure.

FIG. 1 illustrates a schematic cross-sectional view of a composite structure 100, according to an embodiment of the present disclosure. The composite structure 100 includes a first dry fiber preform 110, a second dry fiber preform 120, a third dry fiber preform 130, and a composite radius filler 150 formed from a fiber-reinforced polymer paste. The first dry fiber preform 110, second dry fiber preform 120, and third dry fiber preform 130 extend along a length (into the page as seen in FIG. 1; see also FIG. 3A).

Figure 3A:
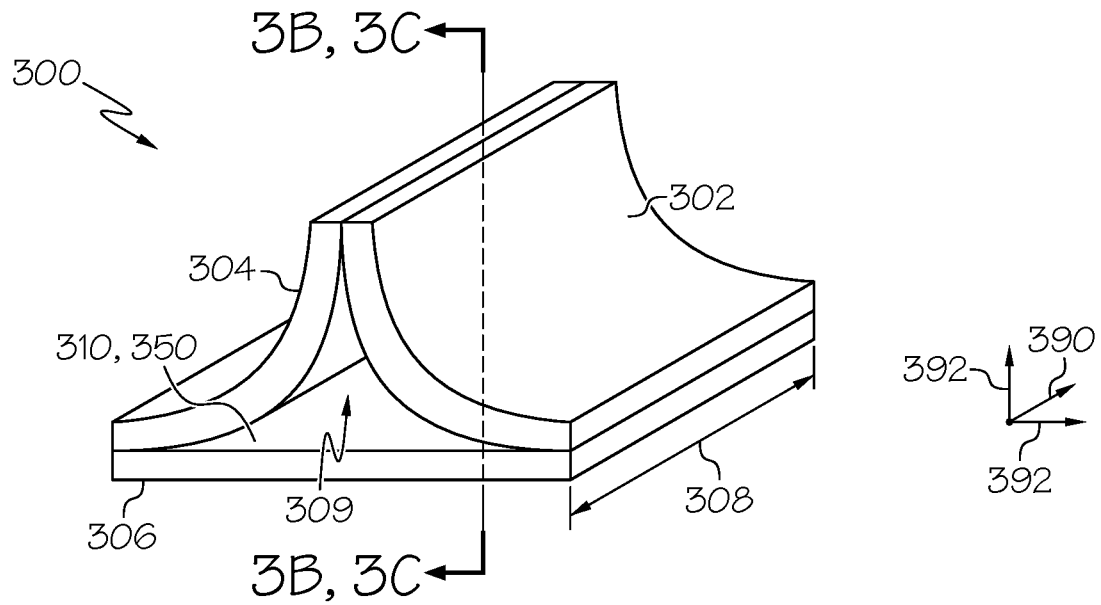
FIG. 3A is a schematic perspective view of a composite structural member.

As seen in FIG. 1, the first dry fiber preform 110 and second dry fiber preform 120 have generally L-shaped cross sections with a radius at the bend in the L. The L-shaped first dry fiber preform 110 and the L-shaped second dry fiber preform 120 are placed back-to-back with the third dry fiber preform 130 extending generally horizontally across under a base defined by the bottom portions of the L-shaped cross sections of the dry fiber preforms 110, 120. The depicted composite radius filler 150 is disposed between the dry fiber preforms 110, 120, 130, and joined with the dry fiber preforms 110, 120, 130 along their length (e.g., length 308 as seen in FIG. 3A) to fill a longitudinal cavity 309 (as seen in FIG. 3A) extending along length 308.

In the embodiment illustrated in FIG. 1, three members are joined with the composite radius filler 150 to form a structure where two of the members are bent or curved and thus form a radius. When two of the members are disposed back to back with the flat third member a cavity is created. The composite radius filler 150 is configured to fill the cavity with a structure that effectively transmits loading. The composite radius filler 150 is used to join with the dry fiber preforms to form a composite assembly including the dry fiber preforms and the composite radius filler 150. The composite assembly (e.g., the dry fiber preforms 110, 120, 130 joined with the composite radius filler 150) is infused with resin and cured before use of the composite structure 100.

It is noted that the particular shapes of the components shown in FIG. 1 are provided by way of illustration and not limitation, and that other numbers, sizes, shapes, and/or arrangements may be employed in various embodiments. Other embodiments include fewer or more dry fiber preforms defining a cavity in which a composite radius filler is disposed.

Various embodiments provide improved mechanical properties, such as improved mechanical properties in one or more directions transverse to an axis extending along the length of a composite structure. Various embodiments also provide for improved assembly of composite structures, for example by providing a radius filler in a form of a fiber-reinforced polymer paste that is applied to dry fiber preforms in-situ or molded and transferred to cavities of dry fiber preforms at or after the time of assembly. In an example, the fiber-reinforced polymer paste is more isotropic or uniform in comparison to radius fillers having continuous, long fibers. The radius filler formed from a fiber-reinforced polymer paste may be used as part of an automated manufacturing process.

In an aspect, various types of additives or reinforcements are added to a resin used to form the fiber-reinforced polymer paste. The resin includes thermoset resin or thermoplastic resin, preferably thermoset resin. Additives are added to improve the mechanical properties of a resin system. Additives are added to modify or enhance physical properties such as the coefficient of thermal expansion (GTE), thermal conductivity, electrical resistivity, friction, wear resistance, or flame resistance, among others. Various types of additives may be used. In an example, additives are made of one or more of ceramic, metal, plastic, carbon, or glass, among others. Additives may be provided in different shapes, such as particles, flakes, or fiber, among others. Various parameters that may be considered when choosing an additive include aspect ratio, volume fraction, additive chemistry, and additive/resin interface. It is noted that additives may also change some of the properties of the resin matrix, for instance, tougheners can be added that blend into the resin, changing its properties.

In the illustrated embodiment, the fiber-reinforced polymer paste is made of a resin, a first group of fibers dispersed within the resin, and a second group of fibers dispersed with the resin. In an example, the resin is an epoxy, or as another example, a phenolic resin. In various embodiments, the resin includes or is formed of a material that is compatible with a material of one or more of the dry fiber preforms (e.g., a material used in a resin used to infuse one or more of the dry fiber preforms). It is noted that the resin material for the fiber-reinforced polymer paste may be the same as the resin material for infusing the dry fiber preforms, or the resin material may differ but be compatible. As used herein, resin materials are compatible when the physical and possible chemical interaction between the resin materials will not adversely affect cure kinetics when the materials are in contact, or adversely affect the physical and chemical characteristics of the cured product. Examples of physical and chemical characteristics include, but are not limited to, mechanical properties and/or chemical resistance properties. A number of factors affect resin compatibility. Chemical structure and molecular weight and distribution are examples of factors that typically affect compatibility. Dynamic mechanical analysis (DMA) is a tool which is used to measure the rheology and identify compatibility characteristics of resin/polymer systems. In some embodiments, the resin material is or includes a material shared in common with one or more of the dry fiber preforms. For example, if the dry fiber preforms are infused with an epoxy resin, the same or similar epoxy resin may be utilized for the fiber-reinforced polymer paste. As another example, if the dry fiber preforms are infused with a phenolic resin, the phenolic resin may be utilized for the fiber-reinforced polymer paste. It is noted that the fiber-reinforced polymer paste may use additional and/or alternative fillers or additives. Additional discussion regarding various resins, fibers, and additional fillers or additives that are utilized in various embodiments are discussed in connection with FIG. 2 herein.

Returning to FIG. 1, the fibers of the first group of fibers in the illustrated embodiment have a length that corresponds to typical noodle dimensions in transverse directions. The fiber lengths may correspond to an actual width of a composite radius filler or a design or intended width of the composite radius filler. For example, the composite radius filler 150 may have a width that is 10 mm wide, 20 mm wide, or 40 mm wide, among others. However, the first group of fibers may have a length of less than 10 millimeters. In various embodiments, the first group of fibers may have a length (or group of lengths) within a range of 0.25 times a transverse dimension (e.g., width of the composite radius filler, height of the composite radius filler) and 2 times the transverse dimension. The second group of fibers may have a length (or group of lengths) that is less than the transverse dimension, for example within a range of 0.05-0.25 times the transverse dimension. Further, the fibers of the first group of fibers may each have an aspect ratio (the ratio of the length of a fiber to the diameter of the fiber) between about 100:1 to 2000:1. In some embodiments, the first group of fibers may have a substantially uniform length, while in other embodiments the first group of fibers may include a mix of fibers having different lengths. In various embodiments, the use of a first group of fibers as discussed herein may provide improved resilience. Additionally, the use of a first group of fibers as discussed herein may provide improved mechanical properties (e.g., lower coefficient of thermal expansion (CTE)) along an axial direction or length of the composite structure 100. Additionally, the use of a first group of fibers as discussed herein may also facilitate the application of the composite radius filler 150 in a form of a fiber-reinforced polymer paste. As seen in the illustrated embodiment, a transverse dimension 151 may be defined as an overall or maximum width of the composite radius filler 150 when disposed between the dry fiber preforms 110, 120, 130. Alternatively, a transverse dimension 152 may be defined as a width at an intermediate height of the composite radius filler 150 when disposed between the dry fiber preforms 110, 120, 130. In other embodiments, a transverse dimension may be defined as an average width. Other transverse dimensions (e.g., height) may be utilized additionally or alternatively in various embodiments.

The second group of fibers has a length that is less than the first group of fibers. The particular length of fibers from the second group of fibers may be selected based on a given application, for example to provide a second group of fibers having a length that is short enough to allow the second group of fibers to align in one or more directions that are transverse to the length of the composite structure 100 (e.g., shorter than a transverse dimension of an expected cross-sectional area between dry fiber preforms, or a predetermined percentage of the transverse dimension, such as 5%, 20%, or 25%, among others). In various embodiments, the use of a second group of fibers as discussed herein allows for improved mechanical properties (e.g., strength or resilience, lower GTE) along transverse directions, improved isotropic characteristics, or improved uniformity of mechanical properties. For example, because the second group of fibers have a length that is smaller with respect to the transverse dimension than the length of the first group of fibers, the second group of fibers may be oriented at additional orientations, or more randomly, with respect to the transverse dimension than orientations provided by the first group of fibers.

Figure 2:
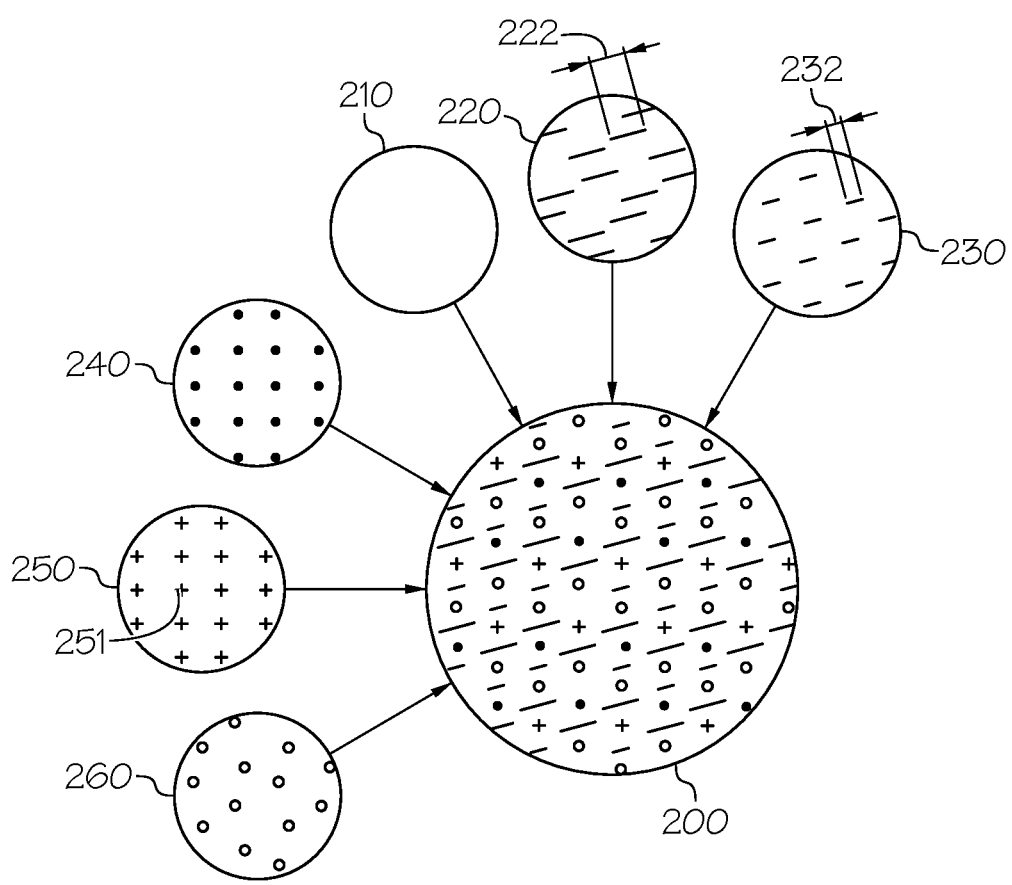
FIG. 2 is a schematic view of a composite radius filler, according to an embodiment of the present disclosure.

FIG. 2 provides a schematic view of a fiber-reinforced polymer paste for use as a composite radius filler material 200 formed in accordance with an embodiment of the present disclosure. The composite radius filler material 200 of the illustrated embodiment is useable for, for example, in-situ application (e.g., formed as a fiber-reinforced polymer paste that may be added to dry fiber preforms at a time of assembly of the dry fiber preforms) or for molding to the shape of a cavity between preforms and transferring to the cavity. The depicted composite radius filler material 200 is formed from a fiber-reinforced polymer paste that includes a resin 210, a first group of fibers 220 dispersed within the resin 210, a second group of fibers 230 dispersed within the resin 210, a third group of fibers 240 dispersed within the resin 210, thixotropic particles 250 dispersed with the resin 210, and a toughening agent 260 dispersed with the resin 210. The composite radius filler material 200 may be used, for example, to provide the composite radius filler 150.

Generally, one or more of the various additives (e.g., first group of fibers 220, second group of fibers 230, third group of fibers 240, thixotropic particles 250, toughening agent 260) are added to the resin 210 to improve one or more properties of the resulting composite radius filler material 200. For example, one or more of the additives may be utilized to lower the CTE of the composite radius filler material 200. As another example, one or more of the additives may be utilized to improve the elastic modulus of the composite radius filler material 200. As another example, one or more of the additives may be utilized to improve the tensile strength of the composite radius filler material 200. As one more example, one or more of the additives may be utilized to maintain a proper flow viscosity for manufacturability of a structure that the composite radius filler 200 is used in connection with.

In various embodiments, the particular configurations (e.g., lengths of fibers, proportions of fibers, fiber materials, proportions of different types and/or lengths of fibers, additional additives, or the like) of the composite radius filler material 200 are selected to balance desired properties for a given application. Generally speaking, the composite radius filler material 200 is configured to have high strength or resiliency in all directions, a low CTE, low modulus, and/or to have desired mechanical properties in all directions (e.g., along a length of a structure as well as transverse to the length of the structure). Certain materials or sizes of additives may beneficially impact one desired property while adversely impacting a different desired property. Accordingly, in various embodiments the proportion of a given material or materials is selected based on a balancing of the desired properties.

For example, the resin 210 may be selected to match or correspond to a resin used for infusing the dry fiber preforms. By way of example, epoxy, phenolic, benzoxazine, or bis-maleimide (BMI) resins may be employed.

To improve the resilience and/or CTE of the resin 210, a filler such as fibers may be added. The fibers, for example, may include one or more of carbon fibers and/or fiberglass. For example, addition of fibers such as carbon fibers or fiberglass, which have CTE's substantially lower than typical resin materials, will lower the CTE of the composite radius filler material 200 (thereby lowering the amount of contraction during cooling, for example from a curing temperature).

Further, addition of fibers such as carbon fiber and/or fiberglass will also improve the strength of typical resin materials. However, fibers may have a high level of stiffness or modulus. If the stiffness or modulus of the composite radius filler material 200 is overly high, a radius filler made from the composite radius filler material 200 may not be able to stretch sufficiently. Accordingly, in various embodiments, the percentage of fibers (e.g., the percentage of fiber volume with respect to resin volume or total filler volume) may be selected to be high enough to provide improved strength and CTE, while low enough to provide a modulus that is not overly high.

Further still, it may be noted that for longer fiber lengths (e.g., fiber lengths that run continuously along an entire length or substantially the entire length), the fibers may provide sufficient or desired strength, CTE, or other properties in one direction (e.g., axial), but not in other directions (e.g., transverse). Accordingly, in various embodiments, fiber lengths or aspect ratios are selected to provide for improved uniformity of properties imparted via the fibers. For example, at least some of the fibers may be selected to have a length that is less than an expected cross-sectional or transverse dimension of the radius filler for which the material is to be used, or otherwise sized to provide a desired amount of fibers that will align transversely (e.g., at least partially transversely) to the length of the radius filler.

For example, at least some of the fibers may have a length that is ½ or less of a width and/or height of an expected cross-section of a radius filler formed from the composite radius filler material 200. In various embodiments, a first group of fibers is utilized to provide improved axial tensile strength, while a second, shorter group of fibers is utilized to provide improved transverse tensile strength and lower CTE. The aspect ratios of the fibers may be selected or configured to be high enough to provide a desired strength and/or CTE but low enough to provide improved homogeneity, or improved distribution of orientations (e.g., axial and transverse) of the fibers to provide improved uniformity of mechanical or structural properties.

The depicted first group of fibers 220 has a first length 222. It may be noted that the first length 222 may correspond to an average length, a maximum length, or other length representative of the lengths of the first group of fibers 220. The lengths of the individual fibers of the first group of fibers 220 may be substantially the same, or may differ. For example, in some embodiments, the lengths of the first group of fibers 220 may vary between 3 and 6 millimeters, or, as another example, the first group of fibers may have a length between 3 and 25 millimeters. Again, it may be noted that the lengths of fibers may be selected based on transverse dimensions (or expected transverse dimensions such as a maximum height or width, or average height or width, among others), and thus may include additional or different numerical values than those expressly mentioned herein.

It has been found, for various fibers, that, with increasing aspect ratio, the modulus of the composite radius filler material 200 increases. The majority of modulus increase is generally achieved for certain fibers at or near an aspect ratio of 100:1. It has also been found, for various fibers, that, with increasing aspect ratio, the strength of the composite radius filler material 200 increases. The majority of strength increase is generally achieved for certain fibers at or near an aspect ratio of 500:1. Accordingly, by using fibers having an aspect ratio of about 500:1, the strength may be at or near a maximum, while still allowing a relatively short fiber to improve fiber distribution and distribution of fiber orientations. Shorter fibers are relatively easier to process, such as by extrusion, than long fibers.

Further improvements to distribution of fibers (and resulting distribution of properties) may be achieved by utilizing additional shorter fibers. In some embodiments, the fibers of the first group have an aspect ratio of 2000:1 or less. In some embodiments, the fibers of the first group have an aspect ratio of 500:1 or less. In some embodiments, the fibers of the first group may have aspect ratios within a range between 100:1 and 2000:1. It may be noted that, generally, the fibers of the first group are more aligned in the axial direction in comparison to the fibers of the second group, which have a more random orientation in all directions (axially and transversely).

The depicted second group of fibers 230 has a second length 232. The second length 232 in the illustrated embodiment is less than the first length 222. It may be noted that the second length 232 may correspond to an average length, a maximum length, or other length representative of the lengths of the second group of fibers 230. The lengths of the individual fibers of the second group of fibers 230 may be substantially the same, or may differ. For example, in some embodiments, the lengths of the second group of fibers 230 may vary between 1 and 3 millimeters. In some embodiments, the average length of the first group of fibers 220 may be about two times or more greater than the average length of the second group of fibers 230. In some embodiments, the first group of fibers 220 may have an aspect ratio (or average aspect ratio) of 500:1, and the second group of fibers 230 may have an aspect ratio (or average aspect ratio) of 100:1.

In various embodiments, the aspect ratio (and/or length) of the first group of fibers 220 may be selected to provide a desired strength and/or CTE, and the aspect ratio (and/or length) of the second group of fibers 230 may be selected based on expected dimensions of a radius filler to be provided by use of the radius filler material 200 (e.g., the length of the second group of fibers 230 may be selected to be less than an expected transverse dimension, or to be less than a predetermined percentage of an expected transverse dimension, such as 5% of the transverse dimension, 10% of the transverse dimension, or 20% of the transverse dimension, among others).

Thus, the first group of fibers 220 may be utilized to impart one or more desired physical properties, and the second group of fibers 230 may be utilized to improve the distribution of the orientation of the fibers with respect to one or more transverse directions. For example, an aspect ratio of 500:1 may be beneficial for achieving desired strength and/or modulus properties. For a fiber with a diameter of 5 micrometers, such an aspect ratio would lead to a length of 2.5 millimeters. Such a length may be too long with respect to the transverse dimensions of a composite radius filler to be formed with the composite radius filler material 200, however. For example, fibers having a diameter of 5 micrometers and an aspect ratio of 500:1 may have a length that may cause partial alignment for typical noodle transverse dimensions. Such partial alignment may reduce performance in the transverse directions. For example, alignment of fibers may result in increases in CTE in the transverse directions. As another example, alignment of fibers may result in less than desired tensile strength in the transverse directions. Accordingly, if the first group of fibers has an aspect ratio of 500:1, a lower aspect ratio may be utilized for the second group of fibers to improve the distribution of the orientations of the fibers, or improve the randomness of the orientations of the fibers. With the fibers arranged in all directions, in contrast to being aligned in a single direction, a lower CTE may be achieved while also lowering the required volume fraction of fiber.

Figure 3B:
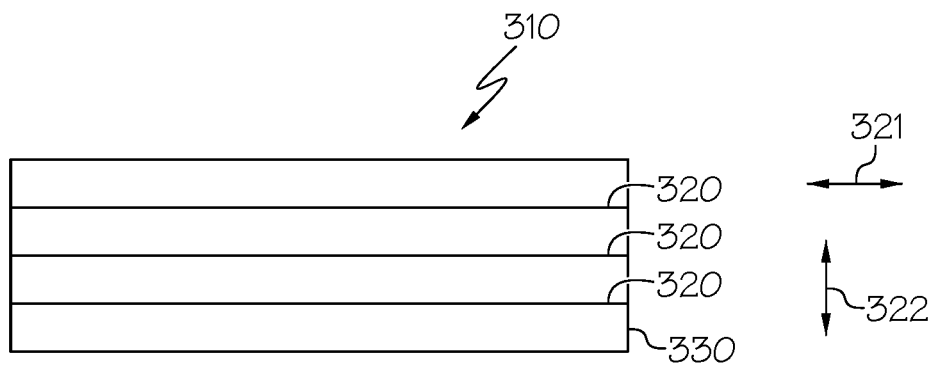
FIG. 3B is a schematic side sectional view of radius filler having continuous fibers oriented axially.
Figure 3C:
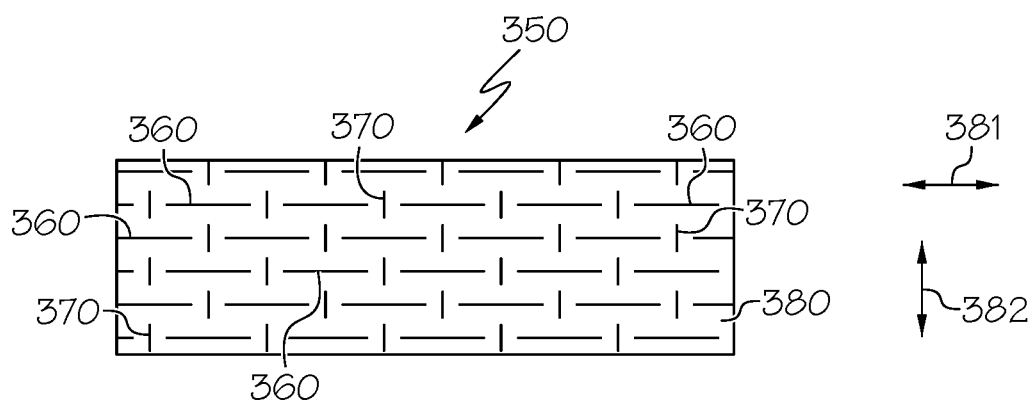
FIG. 3C is a schematic side sectional view of a radius filler having differently sized fibers, according to an embodiment of the present disclosure.

Generally, the lengths of the first group of fibers 220 and the second group of fibers 230 may be selected to provide a balance between transverse and axial properties. FIGS. 3A-3C schematically depict an improved balance of axial and transverse distribution of fibers and/or orientation of fibers that may be achieved by using first and second groups of fibers as discussed herein. FIG. 3A depicts a schematic perspective view of a composite structure 300. The composite structure 300 includes a first dry fiber preform 302, a second dry fiber preform 304, and a third dry fiber preform 306 joined along a length 308 with a composite radius filler 310 or 350. An example of the composite radius filler 310 is depicted in FIG. 3B. The composite radius filler 310 depicted in FIG. 3B, in contrast to various embodiments disclosed herein, includes continuous fibers 320 (e.g., fibers that extend continuously along length 308 of a composite structure). An example of the composite radius filler 350 is depicted in FIG. 3C.

For the view depicted in FIG. 3A, an axial or length direction 390 extends along the length 308, while transverse directions 392 extend perpendicularly to the axial direction 390. Additionally or alternatively to the transverse directions 392 depicted in FIG. 3A, a transverse direction may be defined radially. It may be noted that FIG. 3A is provided schematically for illustrative purposes only, and that the particular arrangement or proportion of the various components or dimensions may differ in practice. For example, the length 308 may be 20 meters, while the cross-sectional area of the composite radius filler may be less than 10 cm$^2$ in some embodiments. The view angles for FIGS. 3B and 3C are shown along line 3-3 of FIG. 3A.

FIG. 3B is a schematic side sectional view of a composite radius filler 310 having continuous fibers 320 embedded in or dispersed within a resin 330, with the continuous fibers 320 oriented axially. Thus, the composite radius filler 310 differs from the composite radius filler materials disclosed herein which have shorter fiber lengths that do not extend along the entire length of a noodle. As seen in FIG. 3B, the continuous fibers 320 extend substantially across the length of the composite radius filler 310. However, the fibers 320 of FIG. 3B extend only axially in direction 321 (or horizontally as seen in FIG. 3B) and not transversely in direction 322 (e.g., vertically as seen in FIG. 3B). Accordingly, properties imparted by the fibers 320 may be generally imparted axially in direction 321 but not transversely in direction 322 for the composite radius filler 320, resulting in less than desired distribution of properties. For example, the composite radius filler 310 may have a CTE substantially lower than that of the resin 330 axially (e.g., the resin alone or when non-reinforced by fibers), but may have a CTE that is about the same as that of the resin 330 transversely (e.g., the resin alone or when non-reinforced by fibers). In an aspect, the continuous fibers 320 are commonly oriented during a forming process, such as an extrusion process, used to form the composite radius filler 310.

FIG. 3C is a schematic side sectional view of a composite radius filler 350 having differently sized fibers dispersed in a resin 380, according to an embodiment of the present disclosure. As seen in FIG. 3C, the fibers include a first group of fibers 360 and a second group of fibers 370. The length of the first group of fibers 360 is greater than the length of the second group of fibers 370. The fibers 360, 370 of the composite radius filler 350 are substantially shorter than the continuous fibers 320 of the composite radius filler 310 depicted in FIG. 3B. Accordingly, the fibers 360, 370 of the composite radius filler 350, especially the second group of fibers 370, are able to be oriented in many different directions (including transverse direction 382 in addition to axial direction 381), while the continuous fibers 320 of the composite radius filler 310 are oriented only axially along direction 321. In an aspect, the first group of fibers 360 having the greater length are commonly oriented in a first direction along longitudinal cavity 309 while the second group of fibers 370 are oriented in many different directions, including a direction transverse to the first direction, as a result of a process, such as extrusion, used to form the composite radius filler 350.

For example, in various embodiments, the length of the first group of fibers may be greater than the length of the second group of fibers by a factor of 2, 3, or 5, among others. As seen in the illustrated embodiment, the length of the second group of fibers 370 is small enough to allow the second group of fibers 370 to orient transversely within the composite radius filler 310. The first group of fibers 360 is shown oriented axially in FIG. 3C. Accordingly, properties imparted by the fibers 360, 370 of the composite radius filler 350 depicted in FIG. 3C may be imparted transversely as well as axially, resulting in improved consistency and/or distribution of properties relative to the composite radius filler 310 depicted in FIG. 3B. For example, the composite radius filler 350 may have a GTE substantially lower than that of the resin 330 axially as well as transversely.

It may be noted that FIG. 3C is provided for illustrative purposes, and the various fibers are shown oriented only axially or only transversely for ease and clarity of illustration. In practice, the particular orientations may vary (e.g., a proportion of the second group of fibers 370 may align axially, or may align partially axially and partially transversely). While the axial and transverse properties may not be exactly equal in various embodiments, the transverse properties may still be improved substantially by use of a second group or fibers or fibers having a length short enough to permit substantial or sufficient transverse orientation in various embodiments. Thus, the second group of fibers 370 may be generally evenly distributed in various dimensions (e.g., directions 381 and 382) randomly. The first group of fibers 360 may be sufficiently long that the first group of fibers 360 are oriented more axially (e.g., along direction 381) than the second group of fibers 370. However, the first group of fibers 360 may be short enough so that the first group of fibers 360 may be partially aligned with directions other than the axial direction 381 (e.g., partially along transverse direction 382). As discussed herein, the first and second group of fibers 360, 370 may be mixed with the resin away from an assembly site into a fiber-reinforced polymer paste, and then applied in situ to the assembly.

It may be noted that the shorter fibers in the second group of fibers impart improved transverse mechanical properties. Accordingly, the shorter fibers may be less effective in improving longitudinal (longitudinal direction is the direction where both groups of fibers may be present) material strength than the longer fibers of the first group of fibers. For example, longer fibers provided more bonding surface with a resin to allow more load transfer to longer fibers from the resin than to shorter fibers. In various embodiments, the proportion of the first and second groups of fibers relative to each other may be selected to provide a desired balance of axial and transverse properties. Additionally or alternatively, the proportion of the first and second groups of fibers relative to each other may be selected to provide a desired level of axial properties while maintaining the total volume of the first and second groups of fibers within a desired range (e.g., 40-50% of a total volume of the composite radius filler material 200). For example, in some embodiments, the first group of fibers 220 may have a volume between 20% and 40% of a combined volume of the first group of fibers 220 and the second group of fibers 230. The second group of fibers 230 may have a volume between 60% and 80% of a combined volume of the first group of fibers 220 and the second group of fibers 230.

In an additional aspect, a composite radius filler may include continuous fibers 320 as shown in FIG. 3B as well as shorter than continuous fibers 360, 370 as shown in FIG. 3C.

Returning to FIG. 2, as discussed herein, the first group of fibers 220 and the second group of fibers 230 may include, for example, fibers made of materials such as carbon fiber, E glass, S2 glass, Nomex®, or Kevlar®, among others. In some embodiments, the first and/or second groups of fibers may be made from a single type of fiber, while in other embodiments a mixture of fiber types may be employed. Generally speaking, carbon fibers have a very low CTE and a higher strength than fiberglass. Fiberglass may have a slightly higher CTE than carbon fiber, but may be substantially more stretchable and resilient. For example, fiberglass may permit twice the amount of stretching as permitted by carbon fiber. Accordingly, the fiber material may be selected based on the particular properties desired for the composite radius filler for a given application. In some embodiments, a mix of carbon fiber and fiberglass may be utilized to provide a balance between the properties of each. For example, in some embodiments, the first and second groups of fibers may each include fibers of both carbon and fiberglass.

It may be noted that the use of fibers will increase the modulus of typical resin materials to which the fibers are added. Accordingly, the proportion of fibers added to the resin may be selected to provide sufficient improvements in strength and/or CTE while limiting the increase in modulus. For example, with fibers at about 10% of the volume of the composite radius filler material 200, the added strength and/or CTE may be less than desired. However, with fibers at 90% of the volume of the composite radius filler material 200, the resulting filler may be more stiff than desired. Accordingly, the volume fraction of the fibers (e.g., the sum of the first group of fibers and the second group of fibers) may be selected to provide a desired amount of improvement to strength and/or CTE while limiting the increase in stiffness or modulus. For example, in various embodiments, the combined volume of the first group of fibers 220 and the second group of fibers 230 may be between 40% and 50% of the total volume of the composite radius filler material 200.

As another example, in various embodiments, the combined volume of the first group of fibers 220 and the second group of fibers 230 may be between 30% and 60% of the total volume of the composite radius filler material 200.

It may be noted that the particular volume selected for a given application may be affected by producibility. For example, if too much fiber is added, the composite radius filler material 200 may become not easily or practicably formable due to increased viscosity and/or due to fibers clogging a process such as extrusion. On the other hand, if the fiber content is too low, the filler material may flow during cure which may cause issues regarding maintenance of a desired shape. Accordingly, the percentage of fiber used may be selected based on a balancing of various factors discussed herein.

It may be noted that the use of first and second groups of fibers as discussed herein may provide generally improved properties and homogeneity of properties for a composite radius filler, however; in practice the distribution of fibers may not be entirely uniform, which may lead to localized areas devoid of fibers from the first or second groups of fibers, or with less than a desired amount of fibers from the first and second groups of fibers. These localized areas may be referred to as resin pockets.

In various embodiments, the third group of fibers 240 may be added to the resin 210 to form the composite radius filler material 200 to help address any resin pockets. The third group of fibers 240 in the illustrated embodiment includes fibers having a shorter length than the second group of fibers 230 to improve the properties or characteristics of any resin pockets formed in the composite radius filler material 200. The third group of fibers 240 may be substantially shorter than the first and second groups of fibers to allow for improved uniform distribution of the third group of fibers 240. The depicted third group of fibers 240 includes carbon nano-tubes. The diameter of the third group of fibers 240 may be, for example, 50 nanometers or less. In some embodiments, the diameter of all or a portion of the third group of fibers 240 may be 100 microns or less. In some embodiments, the diameter of all or a portion of the third group of fibers may be 30 microns or less. The addition of the third group of fibers 240 allows for a more uniform distribution of the short fibers in the fiber-reinforced polymer paste prior to processing and resulting in a desired distribution in the cavity.

For example, in some embodiments, the third group of fibers 240 may include carbon nano-tubes having a length between 100 and 200 microns. The length of the third group of fibers 240 is sufficiently short with respect to the dimensions of the noodle that the third group of fibers 240 will have a random orientation throughout the noodle. In some embodiments, the carbon nano-tubes may have a length of 150 microns or less. The proportion of the third group of fibers 240 may be relatively small. For example, in some embodiments, the third group of fibers 240 may account for less than 1% of the composite radius filler material 200 by volume.

In the embodiment depicted in FIG. 2, the composite radius filler material 200 includes thixotropic particles 250 dispersed within the resin 210. In some embodiments, the thixotropic particles 250 may include nanoparticles 251. The nanoparticles 251, for example, may improve resiliency or strength compared to larger thixotropic particles. Generally, the thixotropic particles 250 are configured to improve the viscosity of the composite radius filler material 200 for improved convenience of use as a fiber-reinforced polymer paste applied to dry fiber preforms during assembly of the components. Generally, the viscosity of the composite radius filler 200 may be configured to support manufacturability. For example, the viscosity of the composite radius filler 200 may be configured to be low enough to fill any sharp corners in a cavity to which a noodle made of the composite radius filler 200 will be added with a resin having desired fiber lengths. The viscosity may also be high enough to provide adequate support and to minimize ply wrinkles formed during a cure process. In various embodiments, a composite radius filler may have a viscosity between 300 and 9000 Poise at a temperature range of 100-140° C. For example, for a three-sided wall structure (e.g., a structure using dry fiber preforms 302, 304, 306 of FIG. 3), a cavity may be formed using two members (e.g., 302, 304), the composite radius filler 200 applied, and the third member (e.g., 306) positioned as desired. Thus, two of the members may be utilized to help form the composite radius filler or noodle.

In various embodiments, the addition of the thixotropic particles allows the composite radius filler material 200 to be processed (such as by extrusion) smoothly, conveniently, and efficiently under an applied processing pressure, but also allows the composite radius filler material 200 to harden or set after processing.

Generally, the material for and the amount of thixotropic nanoparticles may be selected to provide a viscosity that is low enough to fill sharp corners in a cavity (or space between dry fiber preforms) and high enough to provide adequate support to a composite or laminate structure and to minimize or reduce formation of ply wrinkles during curing. Thixotropic nanoparticles, for example, may help increase viscosity during curing, which may help prevent the material being cured from deforming during curing. Ply wrinkles may be caused by insufficient support during deformation. For example, if the viscosity drops too much, noodle material may behave like a liquid during curing in the cavity, allowing dry fiber preforms to move relative to each other. The prevention of deformation provided by the thixotropic particles helps minimize or reduce ply wrinkles. In some embodiments, the thixotropic particles 250 may include nano-silica.

In the embodiment depicted in FIG. 2, the composite radius filler material 200 includes the toughening agent 260, which is configured to improve the resiliency of the resin. For example, in various embodiments, the toughening agent 260 may include one or more of carboxyl terminated polybutadine acrylonitrile (CTBN), core-shell nanoparticles, or nanostrength block copolymers.

Figure 4:
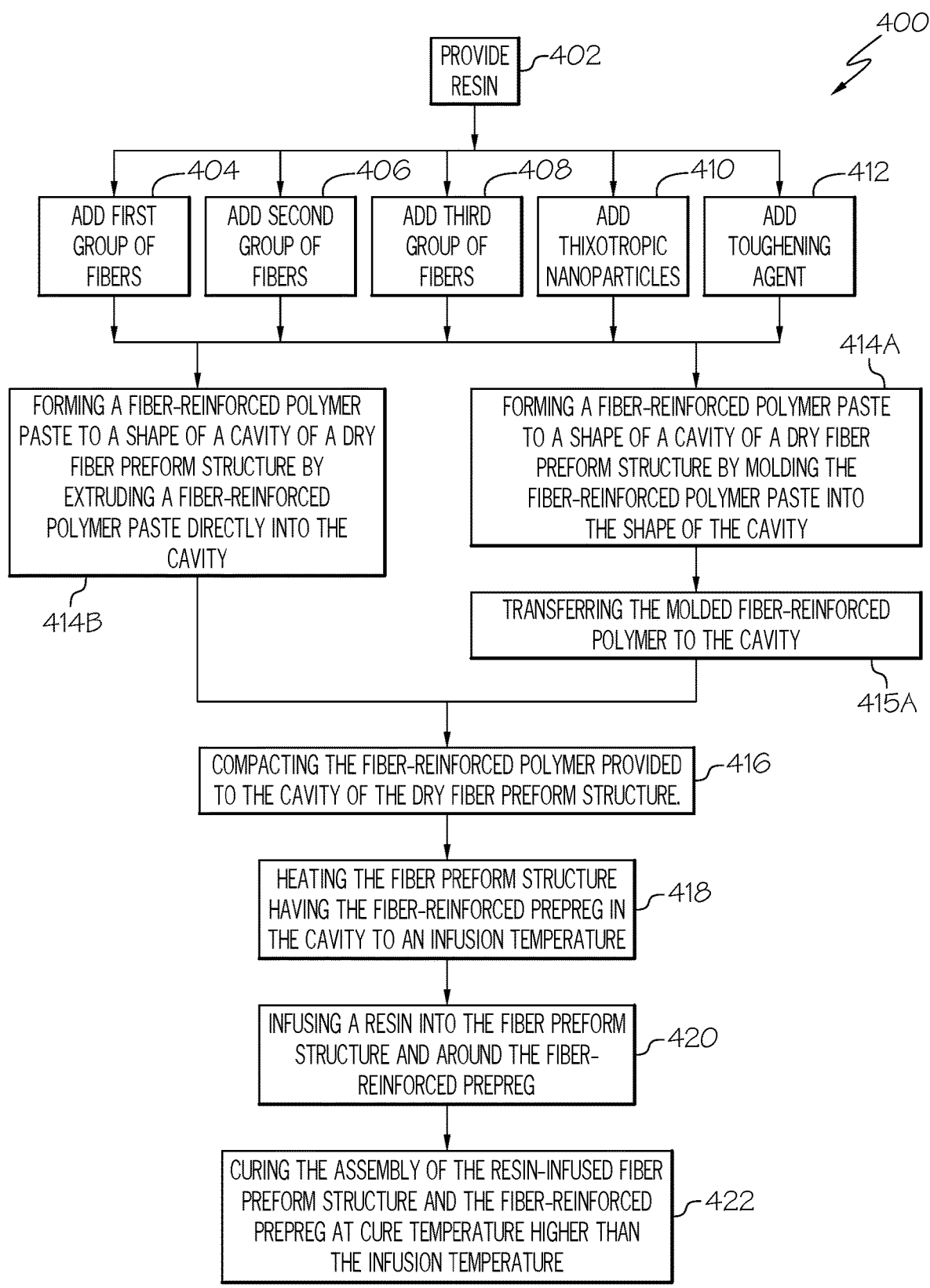
FIG. 4 is a flowchart of a method for forming a composite structure, according to an embodiment of the present disclosure.

FIG. 4 provides a flowchart of a method 400 forming a composite structure using a fiber-reinforced polymer paste in accordance with an embodiment of the present description. The method 400, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

Generally, for example, one or more toughening agents may be added to a resin, followed by addition of thixotropic particles (e.g., nanoparticles) and carbon nanotubes at the same time, then the second (or shorter) group of fibers, and then the first (or longer) group of fibers.

At 402, a resin (e.g., resin 210) is provided. The resin, for example, may be selected to match or correspond to a resin used for infusing a dry fiber preform structure. By way of example, epoxy, phenolic, benzoxazine, or bis-maleimide (BMI) resins may be employed.

At 404, a first group of fibers (e.g., first group of fibers 220) is mixed to the resin. The first group of fibers may have a first length corresponding to an aspect ratio of 2000:1 or less. The length of the first group of fibers may be comparable to the transverse dimensions of the noodle. In some embodiments, the first group of fibers may have a length between 3 and 6 millimeters.

At 406, a second group of fibers (e.g., second group of fibers 230) is mixed to the resin. The second group of fibers, as discussed herein, has a second length that is less than the first length of the first group of fibers. It may be noted that the first and second lengths may correspond to average lengths or may correspond to a range of lengths. The proportion of the first and second groups of fibers with respect to each other and/or with respect to the total volume of the composite filler material may be selected or configured in various embodiments to provide a desired balance of properties or characteristics (e.g., strength, GTE, modulus, homogeneity). For example, in some embodiments, the first group of fibers account for between 20% and 40% of a combined volume of the first and second groups of fibers and the second group of fibers accounts for between 60% and 80% by volume of the combined volume of the first and second group of fibers. Additionally or alternatively, in some embodiments, a combined volume of the first and second group of fibers comprises between 30% and 60% of a total volume of the composite radius filler.

At 408, a third group of fibers (e.g., third group of fibers 240) is mixed to the resin. The third group of fibers may include carbon nanotubes (e.g., having a length of 200 microns or less), and may be added to improve properties (e.g., strength and/or GTE) of potential resin pockets that may be formed in the composite radius filler material.

At 410, thixotropic particles (e.g., thixotropic particles 250) are mixed to the resin. Generally, the thixotropic particles are selected or configured to improve the viscosity of the fiber-reinforced polymer paste for improved ease and effectiveness of application.

At 412, a toughening agent (e.g., toughening agent 260) is mixed to the resin. Generally, the toughening agent is configured to improve the resiliency, or reduce the brittleness, of the fiber-reinforced polymer paste. As discussed herein, the toughening agent 260 may include one or more of CTBN, core-shell nanoparticles, or nanostrength block copolymers.

In an aspect, the fiber-reinforced polymer paste may be prepared as a batch of fiber-reinforced polymer paste, separated into smaller portions of fiber-reinforced polymer paste, and provided to a plurality of cavities for improved efficiency.

At 414A, or alternatively at 414B, the fiber-reinforced polymer paste prepared at steps 402 to 412 is formed to a shape of a cavity of a dry fiber preform structure formed or arranged from one or more dry fiber preforms.

With respect to 414A, the fiber-reinforced polymer paste is extruded through a nozzle with an appropriate cross-section and, at 415A, the extruded fiber-reinforced polymer is placed in a stringer or cavity prior to completely assembling the composite structure.

With respect to 414B, fiber-reinforced polymer paste is directly injected into a cavity to a near net shape prior to completely assembling the composite structure At 416, a pressure is applied to form the fiber-reinforced polymer paste to a final shape. Thus, walls of the fiber preforms may be used to help form the fiber-reinforced polymer paste to the final shape of the cavity.

In an example, forming the fiber-reinforced polymer paste to the shape of the cavity includes extruding the fiber-reinforced polymer paste while positioning the extruded fiber-reinforced polymer paste into the cavity of the dry fiber preform structure. In an aspect, the extruded fiber-reinforced polymer paste is positioned into an open cavity formed between two dry fiber preforms prior to completely assembling the composite structure. For example, with reference to FIG. 3A, an extruded fiber-reinforced polymer paste 310 or 350 may be positioned along a length 308 of the composite structure 300 in a longitudinal cavity 309 formed by first dry fiber preform 302 and second dry fiber preform 304, and then the third dry fiber preform 306 may be joined to complete the composite structure 300.

In another example, forming the fiber-reinforced polymer paste to the shape of the cavity includes molding the fiber-reinforced polymer paste into the shape of the cavity and transferring the molded fiber-reinforced polymer to the cavity. In this case, the fiber-reinforced polymer paste may be extruded using a die and a tool with the same cross section of the cavity required in the composite structure. This process may be automated by, for example, using a robot arm that translates on a track. In an aspect, the molded fiber-reinforced polymer paste is positioned into an open cavity longitudinal 309 formed between two dry fiber preforms prior to completely assembling the composite structure. For example, with reference to FIG. 3A, a molded fiber-reinforced polymer paste 310 or 350 may be positioned along a length 308 of the composite structure 300 in a longitudinal cavity 309 formed by first dry fiber preform 302 and second dry fiber preform 304, and then the third dry fiber preform 306 may be joined to complete the composite structure 300.

At 418, the dry fiber preform structure having the fiber-reinforced polymer paste in the cavity is heated to an infusion temperature.

At 420, a resin is infused into the fiber preform structure and around the fiber-reinforced polymer paste. The resin may be the same or different from the resin used for preparing the fiber-reinforced polymer paste.

At 422, the assembly of the resin-infused fiber preform structure and the fiber-reinforced polymer paste is cured at a cure temperature higher than the infusion temperature. For example, the assembly may be heated to a predetermined cure temperature at a predetermined pressure for a predetermined amount of time to cure the assembly. After curing, the assembly may be cooled (e.g., to room temperature).

In applying the pressure to form the fiber-reinforced polymer paste to the final shape, the fiber-reinforced polymer paste provided to the cavity (i.e. noodle in the noodle cavity) may be rolled using a mechanical roller in the fiber preform or by a separate forming tool following molding or extrusion to further consolidate and form the noodle to the desired cross-sectional geometry.

It is noted that, as viscosity is a function of temperature, the temperature may be controlled to provide desired viscosity. For example, in some embodiments, fiber-reinforced polymer paste may be warmed (e.g., to 190° F.) to soften for extrusion into a cavity. It is also noted that pressure may be applied to the fiber-reinforced polymer paste, for example, after the fiber-reinforced polymer paste is placed in a stringer, for example to help force the fiber-reinforced polymer paste into sharp corners.

The method 400 may further include applying additional fiber preforms after step 414 and before step 416 to complete the layup, fully encapsulating the noodle with dry fiber plies, followed by resin-infusion.

If the fiber-reinforced polymer paste is molded into the shape of the cavity and transferring the molded fiber-reinforced polymer to the cavity, then an intermediary tool is used and the epoxy may optionally undergo a B-staging operation to partially cure the fiber-reinforced polymer paste in order to maintain the geometry provided by the molding to be retained in subsequent transfer to the cavity of the fiber preform structure. If an intermediary tool is used the partially cured noodle is then transported from the intermediary tool and is placed within the dry fiber layup of stiffeners.

In an aspect, the noodle consists of a volume fraction of carbon and glass plies in the range of approximately 30% to 70% with the remainder being epoxy resin matrix.

According to the present description, the noodle and dry fiber preform are present during resin infusion rather than adding the noodle after resin infusion. By the presence of the noodle during with the fiber preform during resin-infusion, a more integral structure is promoted without stress issues of other methods. The infused assembly is then elevated to a second higher cure temperature and the resins of the noodle and resin-infused fiber preform are cured simultaneously forming a chemically bonded and cured integrated composite structure offering a high-performance noodle in a low-cost composite layup.

According to the present description, a low-cost noodle manufacture is provided, resulting in robust, crack free noodles. This eliminates or reduces noodle cracking due to cure shrinkage and residual thermal stress and improves structural performance of the resulting composite structure.

According to the present description, common noodle fabrication process and materials specifications can be maintained because a remainder of the dry fiber layup preserves forming, layup, material cost and deposition rate benefits of dry reinforcement and resin infusion—Manufacturing equipment can support a range of noodle geometries, can support multiple projects compared with conventional noodle tooling which is hard cut steel tooling for one fixed shape.

Embodiments of the present disclosure provide for improved composite radius filler materials. For example, mechanical or structural properties are improved in various embodiments. As another example, various embodiments provide a composite radius filler that may be conveniently, effectively, and efficiently be applied in-situ during assembly of a structural assembly.

Figure 5:
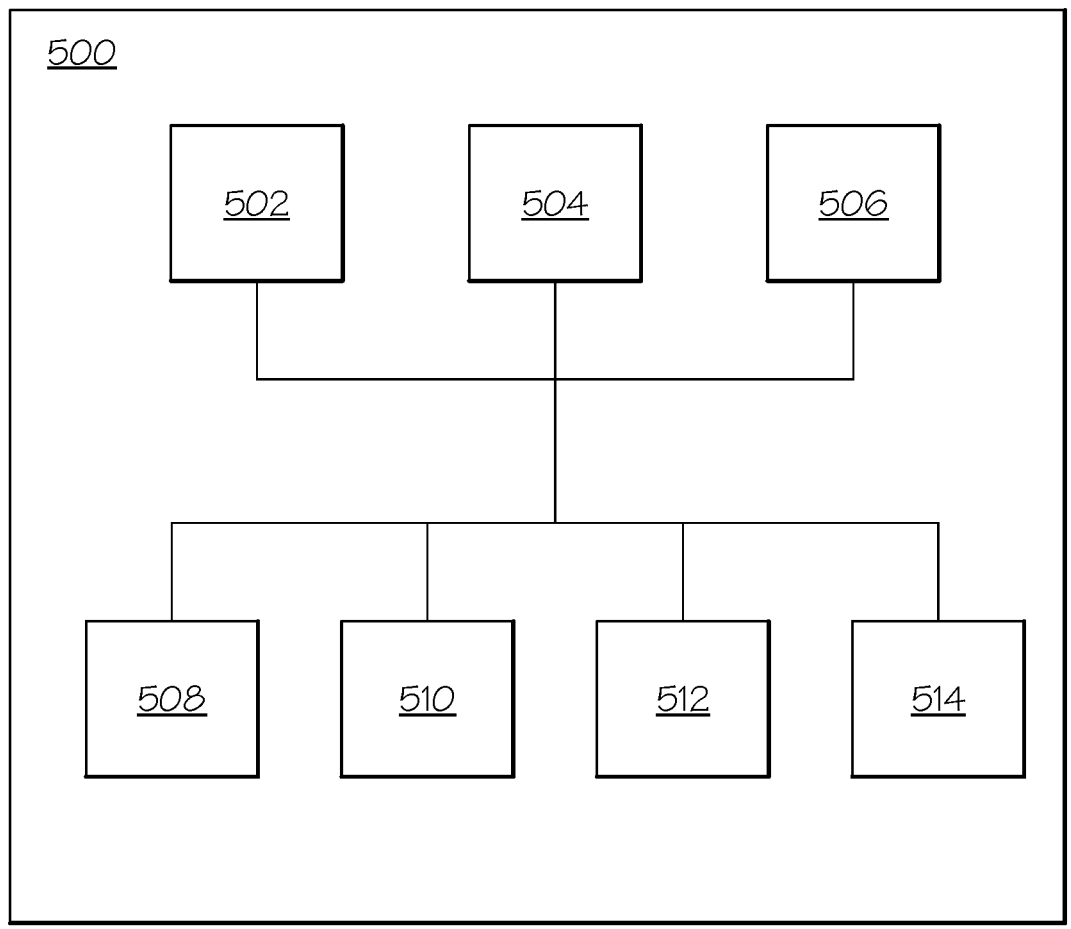
FIG. 5 is a diagram of an exemplary system for forming a composite structure.

FIG. 5 illustrates an exemplary system 500 for forming a composite structure. As shown in FIG. 5, the system includes: a noodle forming device 502 for forming a fiber-reinforced polymer paste to a shape of a cavity of a dry fiber preform structure; a partial cavity forming device 504 for forming a dry fiber preform structure having a partial cavity therein; a noodle placing device 506 for placing the formed noodle into the partial cavity; a full cavity forming device 508 for completely assembling the composite structure to close the partial cavity; a compaction device 510 for compacting the fiber-reinforced polymer provided to the cavity of the dry fiber preform structure; a resin infusion device 512 for infusing resin into the dry fiber preform structure and around the fiber-reinforced polymer; and a curing device 514 for curing the resin-infused dry fiber preform structure and the fiber-reinforced polymer.

The noodle forming device 502 may include, for example, an extrusion device for directly infusing a fiber-reinforced polymer paste into the cavity or an extrusion device for molding a fiber-reinforced polymer paste into a shape of the cavity. In the latter case, the system 500 further include the noodle placing device 506 for transferring the molded fiber-reinforced polymer to the cavity.

The partial cavity forming device 504 includes any apparatus for forming a dry fiber preform structure to have an open cavity therein.

The noodle placing device 506 includes any apparatus for transferring a molded fiber-reinforced polymer to the cavity.

The full cavity forming device 508 includes any apparatus for closing the dry fiber preform structure to have a closed cavity around the fiber-reinforced polymer placed therein.

The compaction device 510 includes any apparatus for compacting the fiber-reinforced polymer provided to the cavity of the dry fiber preform structure.

The resin infusion device 512 includes any apparatus for infusing resin into the dry fiber preform structure and around the fiber-reinforced polymer.

The curing device 514 includes any apparatus for curing the resin-infused dry fiber preform structure and the fiber-reinforced polymer at a cure temperature.

Figure 6:
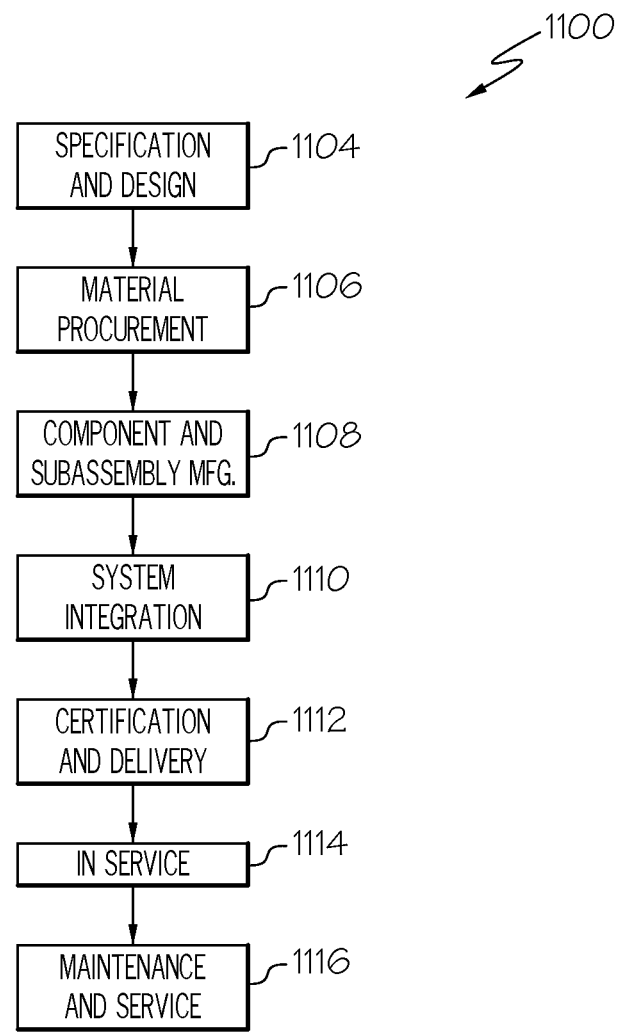
FIG. 6 is a block diagram of aircraft production and service methodology.
Figure 7:
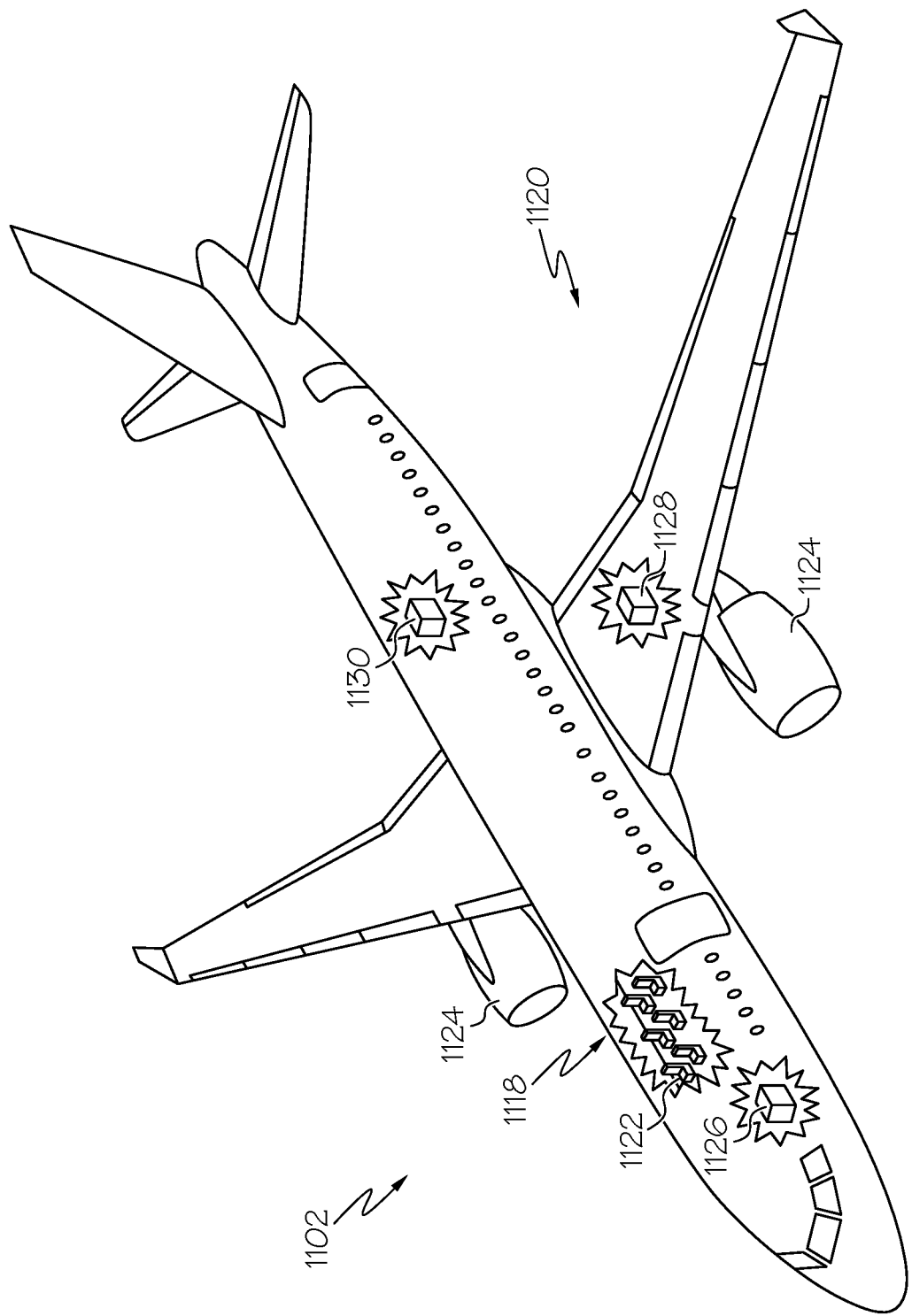
FIG. 7 is a schematic illustration of an aircraft.

Examples of the present disclosure may be described in the context of aircraft manufacturing and service method 1100 as shown in FIG. 6 and aircraft 1102 as shown in FIG. 7. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on. For example, various aspects disclosed herein may be utilized during one or more of steps 1106, 1108, or 1110 of the method 1100, and/or in connection with one or more of elements 1118 or 1122 of the aircraft 1102.

As shown in FIG. 7, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. In particular, the disclosed method for forming a composite structure can be used at least during component and subassembly manufacturing (bloc 1108), during system integration (block 1110), and during routine maintenance and service (block 1116), and the disclosed method for forming a composite structure can be used for at least an airframe 1118 and interior 1222 of aircraft 1102.

For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Although various embodiments of the disclosed methods for forming composite structures have been shown and described, modifications may occur to those skilled in the art upon reading the specification. The present application includes such modifications and is limited only by the scope of the claims.

What is claimed is:

1. A method for forming a composite structure, comprising steps of:
providing a fiber-reinforced polymer paste to a cavity of a dry fiber preform structure, the fiber-reinforced polymer paste comprising resin and at least a first group of fibers dispersed within the resin;
heating the dry fiber preform structure having the fiber-reinforced polymer paste in the cavity to an infusion temperature; and
infusing resin into the dry fiber preform structure that has been heated and around the fiber-reinforced polymer paste that has been heated but not into the fiber-reinforced polymer paste that has been heated.

2. The method of claim 1, further comprising compacting the fiber-reinforced polymer paste by applying pressure to form the fiber-reinforced polymer paste to a final shape using walls of the dry preform structure to help form the fiber-reinforced polymer paste to the final shape.

3. The method of claim 1, wherein the at least a first gr of fibers dispersed within the resin include carbon nano-tubes.

4. The method of claim 1, further comprising curing the fiber-reinforced poi paste and the infused resin at a cure temperature higher than said infusion temperature.

5. The method of claim 1, wherein the step of providing the fiber-reinforced polymer paste to the cavity of the dry fiber preform structure includes extruding the fiber-reinforced polymer paste directly into the cavity.

6. The method of claim 1, further comprising applying one or more additional dry fiber preforms after the fiber-reinforced polymer paste is provided to the cavity of the dry fiber preform structure and before the infusion of the resin.

7. The method of claim 1, wherein the step of providing the fiber-reinforced polymer paste to the cavity of the dry fiber preform structure includes molding the fiber-reinforced polymer paste into the shape of the cavity and transferring the molded fiber-reinforced polymer to the cavity.

8. The method of claim 7, further comprising partially curing the molded fiber-reinforced polymer paste before transferring the molded fiber-reinforced polymer paste to the cavity.

9. The method of claim 1, further comprising preparing the fiber-reinforced polymer paste by mixing a group of fibers into a resin.

10. The method of claim 9, wherein the prepared fiber-reinforced polymer paste is prepared as a batch of fiber-reinforced polymer paste, separated and provided to a plurality of cavities.

11. The method of claim 9, wherein the step of mixing a group of fibers into said resin comprises:
adding a first group of fibers within the resin, the first group of fibers having a first length, wherein the first group of fibers has an aspect ratio of 2000 or less; and
adding a second group of fibers within the resin, the second group of fibers having a second length that is shorter than the first length.

12. The method of claim 11, wherein the first group of fibers includes fibers having a length between 3 and 6 millimeters.

13. The method of claim 11, wherein the first group of fibers comprises between 20% and 40% of a combined volume of the first and second groups of fibers; and the second group of fibers comprises between 60% and 80% by volume of the combined volume of the first and second group of fibers.

14. The method of claim 13, wherein the combined volume of the first and second group of fibers comprises between 30% and 70% of a total volume of said fiber-reinforced polymer paste.

15. The method of claim 11, further comprising adding a third group of fibers to the resin, the third group comprising carbon nano-tubes.

16. The method of claim 1, further comprising adding thixotropic nanoparticles to the resin.

17. The method of claim 1, further comprising adding a toughening agent to the resin.

18. The method of claim 1, wherein the fiber-reinforced polymer paste comprises one or more of epoxy, phenolic, benzoxazine, and bis-maleimide (BMI) resins.

19. The method of claim 1, wherein the fiber-reinforced polymer paste comprises one or more of carbon fibers and fiberglass.

20. The method of claim 1, wherein the composite structure is an aircraft structural element.

* * * * *